(12) United States Patent
Dorfstätter et al.

(10) Patent No.: US 10,135,308 B2
(45) Date of Patent: Nov. 20, 2018

(54) ELECTRICAL MACHINE AND METHOD FOR PRODUCING AN ELECTRICAL SHEET

(71) Applicant: Magna Powertrain AG & Co KG, Lannach (AT)

(72) Inventors: Pirmin Dorfstätter, Vienna (AT); Gereon Johannes Pusch, Traiskirchen (AT)

(73) Assignee: MAGNA POWERTRAIN AG & CO KG, Lannach (AT)

(*) Notice: Subject to any disclaimer, the term of this patent is extended or adjusted under 35 U.S.C. 154(b) by 127 days.

(21) Appl. No.: 14/762,129

(22) PCT Filed: Dec. 5, 2013

(86) PCT No.: PCT/EP2013/075685
§ 371 (c)(1),
(2) Date: Jul. 20, 2015

(87) PCT Pub. No.: WO2014/114396
PCT Pub. Date: Jul. 31, 2014

(65) Prior Publication Data
US 2015/0333583 A1    Nov. 19, 2015

(30) Foreign Application Priority Data
Jan. 25, 2013  (DE) .................. 10 2013 201 199

(51) Int. Cl.
*H02K 1/27* (2006.01)
*H02K 15/03* (2006.01)

(52) U.S. Cl.
CPC ........... *H02K 1/276* (2013.01); *H02K 1/2766* (2013.01); *H02K 15/03* (2013.01); *Y10T 29/49014* (2015.01)

(58) Field of Classification Search
CPC ...... H02K 15/03; H02K 1/276; H02K 1/2766; Y10T 29/49014
USPC ........................................ 310/156.53; 29/598
See application file for complete search history.

(56) References Cited

U.S. PATENT DOCUMENTS

| | | | |
|---|---|---|---|
| 3,457,445 A | 7/1969 | Dochterman | |
| 7,939,985 B2* | 5/2011 | Yamada | H02K 1/276 310/156.53 |
| 2009/0230801 A1* | 9/2009 | Yamada | H02K 1/276 310/156.16 |
| 2011/0062815 A1* | 3/2011 | Aota | H02K 1/2766 310/156.53 |

(Continued)

FOREIGN PATENT DOCUMENTS

| | | |
|---|---|---|
| DE | 242057 A1 | 1/1987 |
| DE | 102008044127 A1 | 6/2009 |

(Continued)

OTHER PUBLICATIONS

English translation of foreign document EP 1376815 A1.*

(Continued)

*Primary Examiner* — Alex W Mok
(74) *Attorney, Agent, or Firm* — Dickinson Wright PLLC

(57) ABSTRACT

An electrical machine with a rotor which has at least one electrical sheet. The electrical sheet having crosspieces, wherein the crosspieces have a deformation in a direction normal to the plane of the electrical sheet.

15 Claims, 5 Drawing Sheets

(56) References Cited

U.S. PATENT DOCUMENTS

Figure 1:
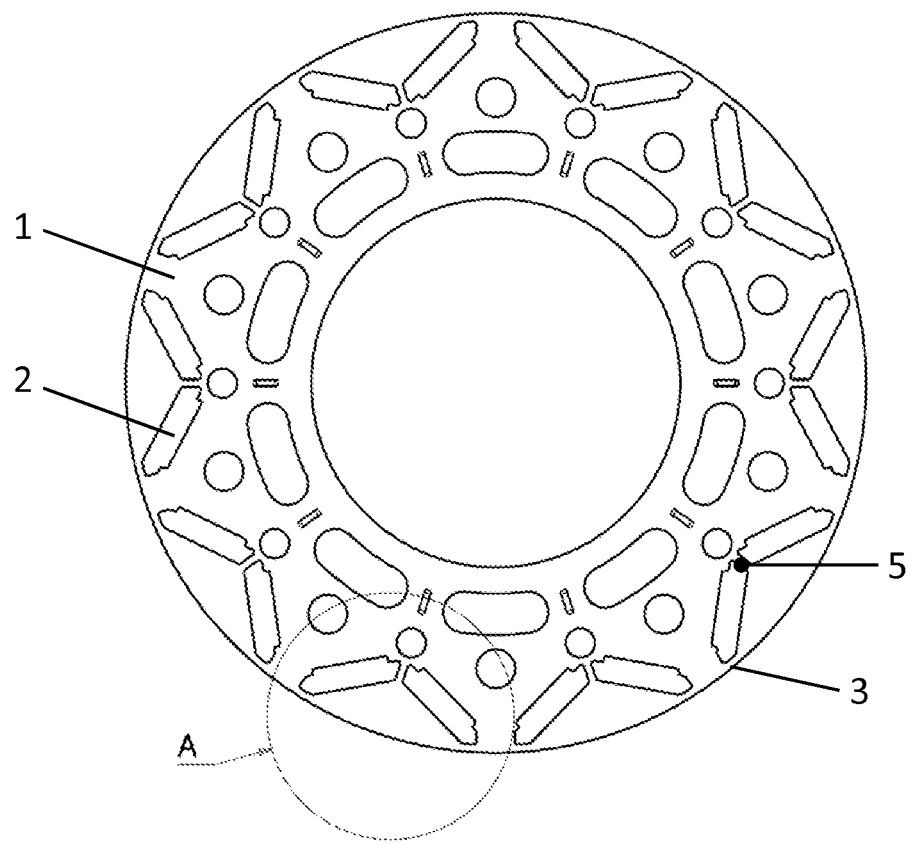

| | | | | |
|---|---|---|---|---|
| 2011/0163624 A1* | 7/2011 | Hori | ................ | H02K 1/276 310/156.53 |
| 2012/0091845 A1* | 4/2012 | Takemoto | ............. | H02K 1/276 310/156.01 |
| 2012/0126658 A1* | 5/2012 | Sanji | .................. | H02K 1/276 310/216.009 |
| 2012/0222289 A1* | 9/2012 | Nagai | ................. | H02K 1/276 29/598 |
| 2012/0248920 A1* | 10/2012 | Takahashi | ............. | H02K 1/276 310/156.61 |
| 2013/0038163 A1* | 2/2013 | Kim | ..................... | H02K 1/276 310/156.16 |
| 2013/0134817 A1* | 5/2013 | Nagahama | ............. | H02K 1/28 310/156.08 |

FOREIGN PATENT DOCUMENTS

| | | |
|---|---|---|
| EP | 1376815 A1 | 1/2004 |
| WO | WO2012157056 A1 | 11/2012 |

OTHER PUBLICATIONS

Derwent Abstract of foreign document DD 242057 A.*
International Search Report dated Oct. 24, 2014.
Search Report dated Jun. 11, 2018 issued by the State Intellectual Property Office in corresponding Chinese Patent Application No. 2013800712527.

* cited by examiner

ELECTRICAL MACHINE AND METHOD FOR PRODUCING AN ELECTRICAL SHEET

CROSS-REFERENCE TO RELATED APPLICATION

This application is a U.S. National Stage of International Application No. PCT/EP2013/075685 filed Dec. 5, 2013 and which claims the benefit and priority of German Application No. DE 10 2013 201 199.7 filed Jan. 25, 2013. The entire disclosure of each of the above applications is incorporated herein by reference.

TECHNICAL FIELD

The present invention relates to an electrical machine with a rotor which has at least one electrical sheet, the electrical sheet having crosspieces.

The invention also relates to a method of producing an electrical sheet for a rotor of an electrical machine.

BACKGROUND

It is usually the case that such electrical machines, for example permanently excited synchronous machines, but also externally excited machines, reluctance machines or hybrid machines, use an entire sheet assembly containing a plurality of electrical sheets.

The electrical sheets have narrow crosspieces, in particular on the periphery of pockets, that is to say of recesses such as magnet pockets for accommodating permanent magnets. In order to reduce the magnetic conductivity of the electrical sheets in the region of the magnet pockets, and for the resulting increase in the magnetic flux which helps to provide the torque of the electrical machine, it is known for magnet pockets to be configured such that crosspieces which are as thin as possible form in the vicinity of the magnet pockets.

An embedded magnet motor with a rotor, the rotor comprising a rotor core, wherein the rotor core comprises radial accommodating slots, first oblique accommodating slots and second oblique accommodating slots, is known, for example, from DE 102008044127 A1. Portions of each radial accommodating slot on which the longitudinal slots are provided form interspaces in respect of the associated radial magnet. The magnetoresistance is increased in this way. The longitudinal slots separate the magnetic paths from the radial magnet.

In order to produce electrical sheets, it is known for the required shapes to be punched, for example, out of a disk of sheet metal.

DD 242 057 A1 discloses a method of reducing eddy-current losses for isotropic electrical steel sheets, wherein an annealed sheet, finally, is cold formed again with a low degree of deformation.

SUMMARY

It is an object of the invention to improve electrical machines with a rotor which has at least one electrical sheet and to improve, in particular, the magnetic flux which generates the torque of the electrical machine.

It is also an object of the invention to specify an improved method that is intended for producing an electrical sheet for a rotor of an electrical machine and which improves, in particular, the magnetic flux which generates the torque of the electrical machine.

The object is achieved by an electrical machine with a rotor which has at least one electrical sheet, the electrical sheet having crosspieces, wherein the crosspieces have a deformation in a direction normal to the plane of the electrical sheet.

According to the invention, crosspieces which are as narrow as possible have a deformation which is in a direction normal to the plane of the electrical sheet, that is to say, for example, a round, polygonal or undulating deformation which extends away from the plane of the electrical sheet.

It has been found that such local shaping of the crosspieces reduces the magnetic flux density in the region of the deformation and increases the same in other, desired regions, and therefore the magnetic flux which generates the torque of the electrical machine is improved to a significant extent. Furthermore, the mechanical strength is thereby increased precisely at the relevant locations at which high tensile strength is required. It is thus possible for the crosspieces to be made even narrower still, as a result of which the magnetic flux is improved yet further.

The object is also achieved by a method which is intended for producing an electrical sheet for a rotor of an electrical machine and in which the electrical sheet has crosspieces punched in, and the crosspieces are then cold formed, in particular bent, in a direction normal to the plane of the electrical sheet.

The crosspieces are preferably bent in a direction normal to the plane of the electrical sheet. This bending can be produced straightforwardly and results in a considerable improvement in the desired magnetic flux.

It is preferable for pockets to be formed in the electrical sheet and the pockets are separated from the outer circumference of the electrical sheet by the crosspieces deformed according to the invention. The crosspieces are thus located radially outside the pockets.

As an alternative, or in addition, it is also possible for crosspieces deformed according to the invention to be arranged between pockets, and therefore the pockets are separated from one another by narrow crosspieces, wherein said pockets may be the same pockets which are separated from the outer circumference of the electrical sheet by crosspieces deformed according to the invention or else other, second pockets.

The pockets may be, in particular, magnet pockets, and therefore permanent magnets are arranged in the magnet pockets. It is also possible, however, for the pockets to be, for example, free recesses.

The electrical machine is preferably a permanently excited synchronous machine, an externally excited machine, a reluctance machine or a hybrid machine.

According to the invention, a method of producing an electrical sheet for a rotor of an electrical machine has the following steps:

punching crosspieces in the electrical sheet,
deforming, in particular bending, the crosspieces in a direction normal to the plane of the electrical sheet using cold forming.

The cold forming of the crosspieces reduces the magnetic conductivity of the crosspieces and thus reduces the local magnetic flux density and improves the desired magnetic flux. In addition, the mechanical strength of the electrical sheet is increased.

According to one embodiment, the crosspieces are cold formed, in particular bent back and forth, a number of times, in particular at short time intervals, in a direction normal to the plane of the electrical sheet, in order to achieve a desired level of magnetic conductivity and mechanical strength at the crosspieces.

According to one embodiment, the crosspieces, following the punching and deforming operations, are formed back again, and therefore the crosspieces, ultimately, are planar again. This makes it possible, on the one hand, for the magnetic flux to be optimized, as a result of the electrical sheet being planar throughout, but also for further processing of the electrical sheets to be more straightforward.

It is preferable, in a method according to the invention, for pockets to be punched in the electrical sheet, and, in particular, the pockets are magnetic pockets, and therefore permanent magnets may be arranged in the magnet pockets.

The pockets are preferably separated from the outer circumference of the electrical sheet by the crosspieces.

As an alternative, or in addition, the pockets are preferably separated from one another by the crosspieces.

DRAWINGS

Figure 1A:
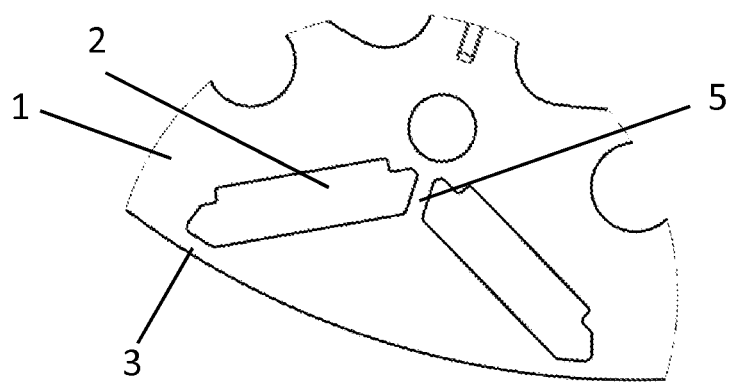
Figure 2:
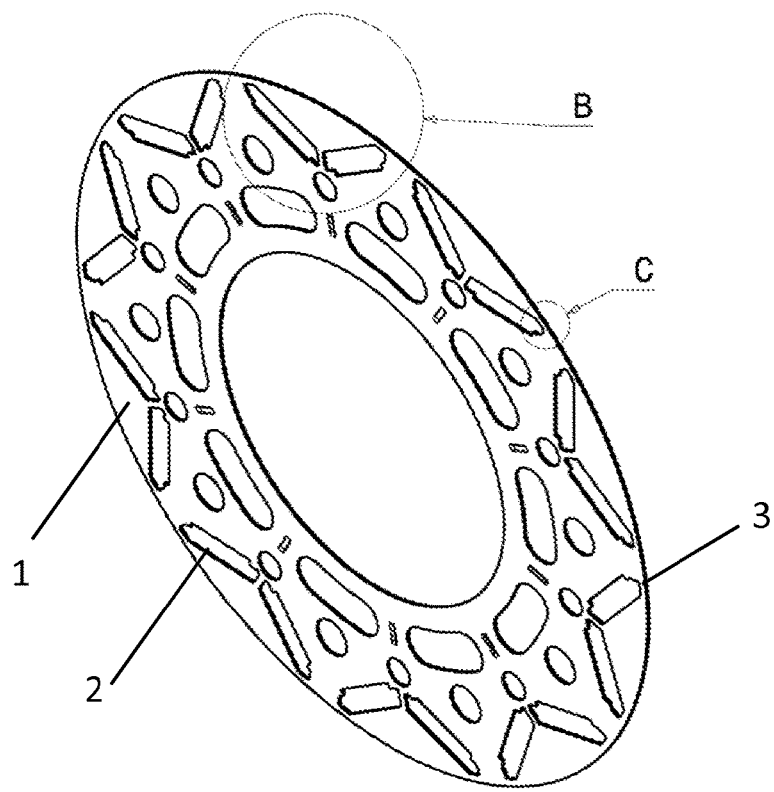
Figure 2B:
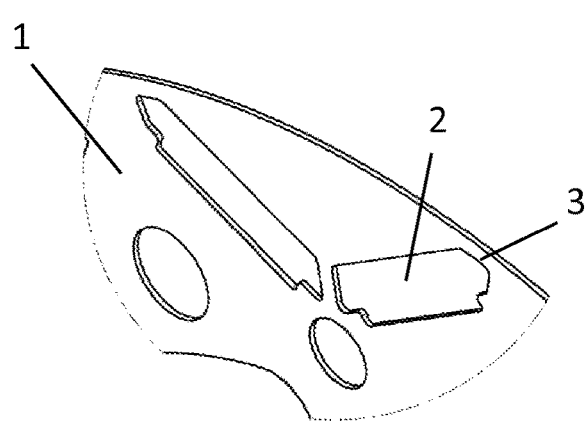
Figure 2C:
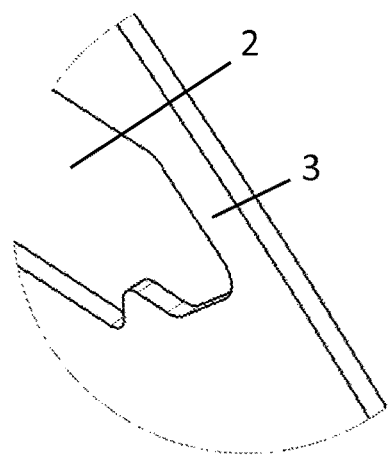
Figure 3:
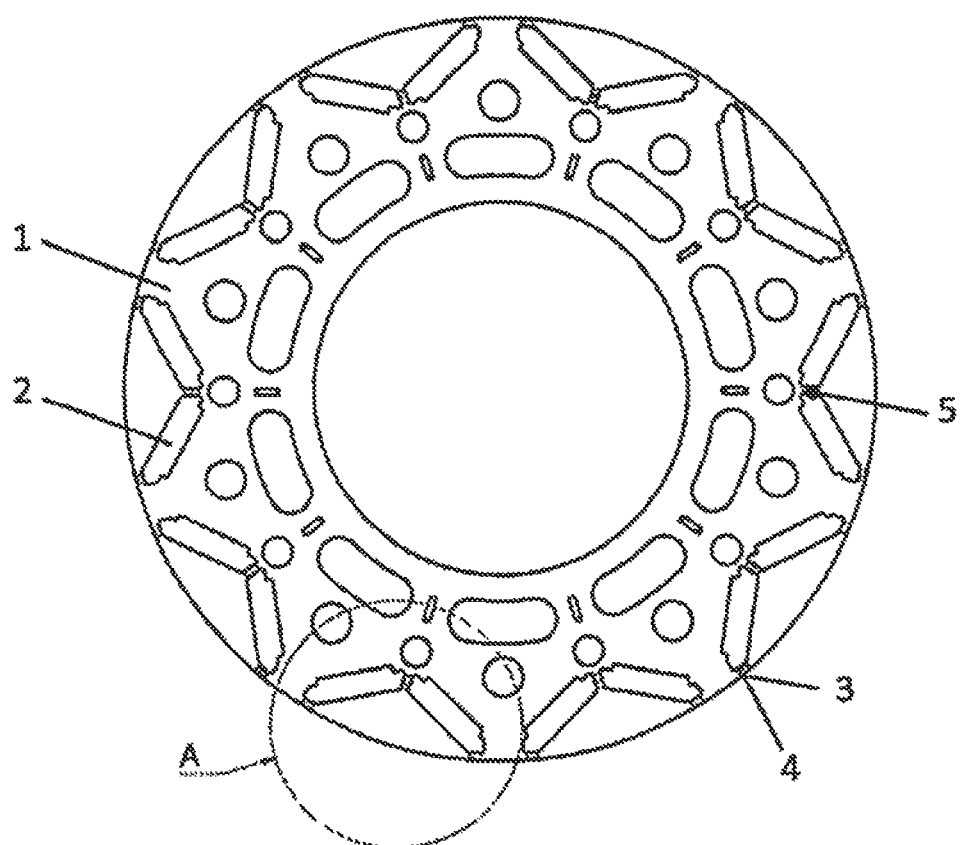
Figure 3A:
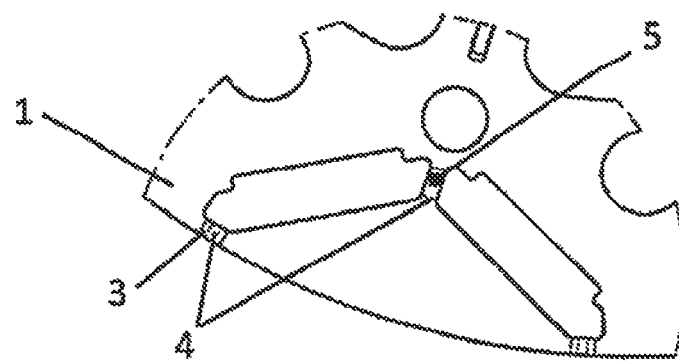
Figure 4:
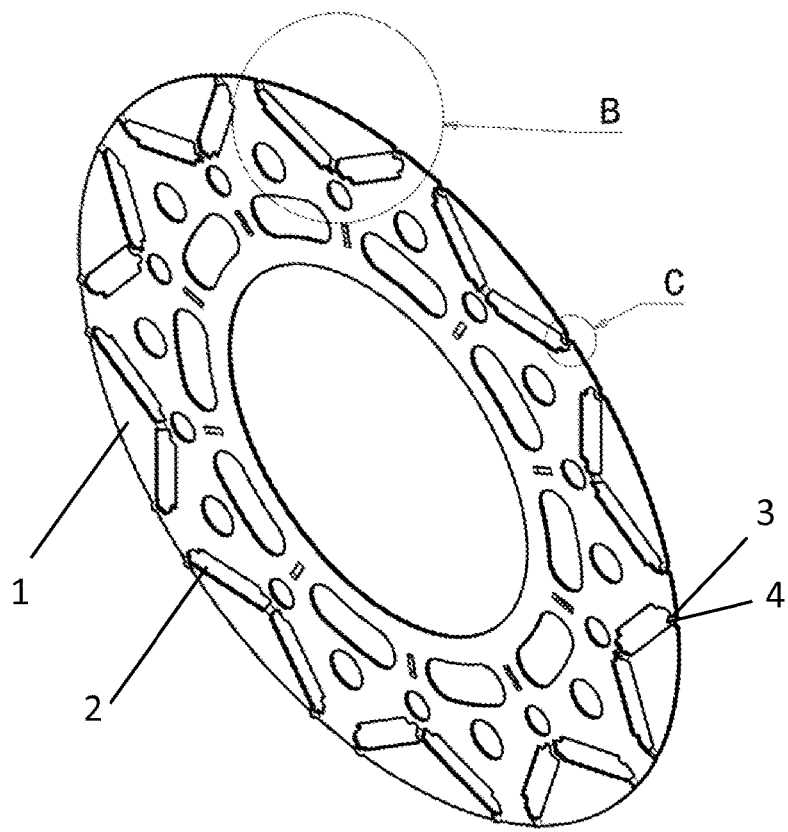
Figure 4B:
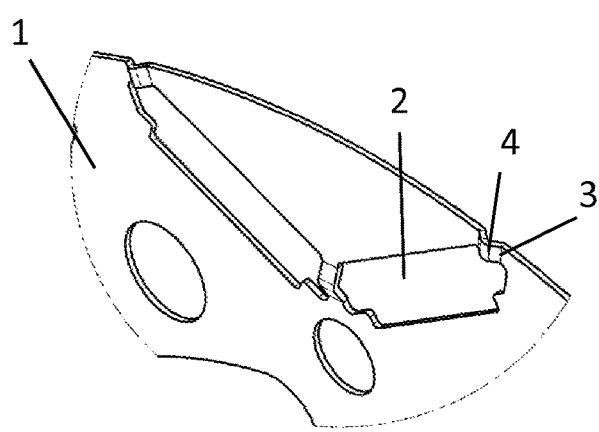
Figure 4C:
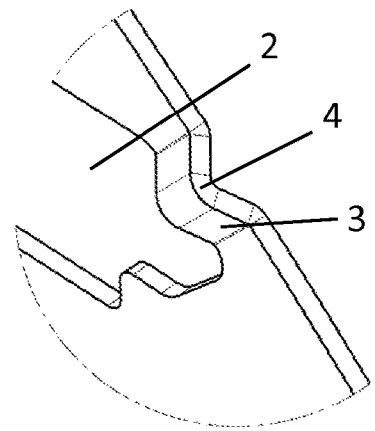
Figure 5:
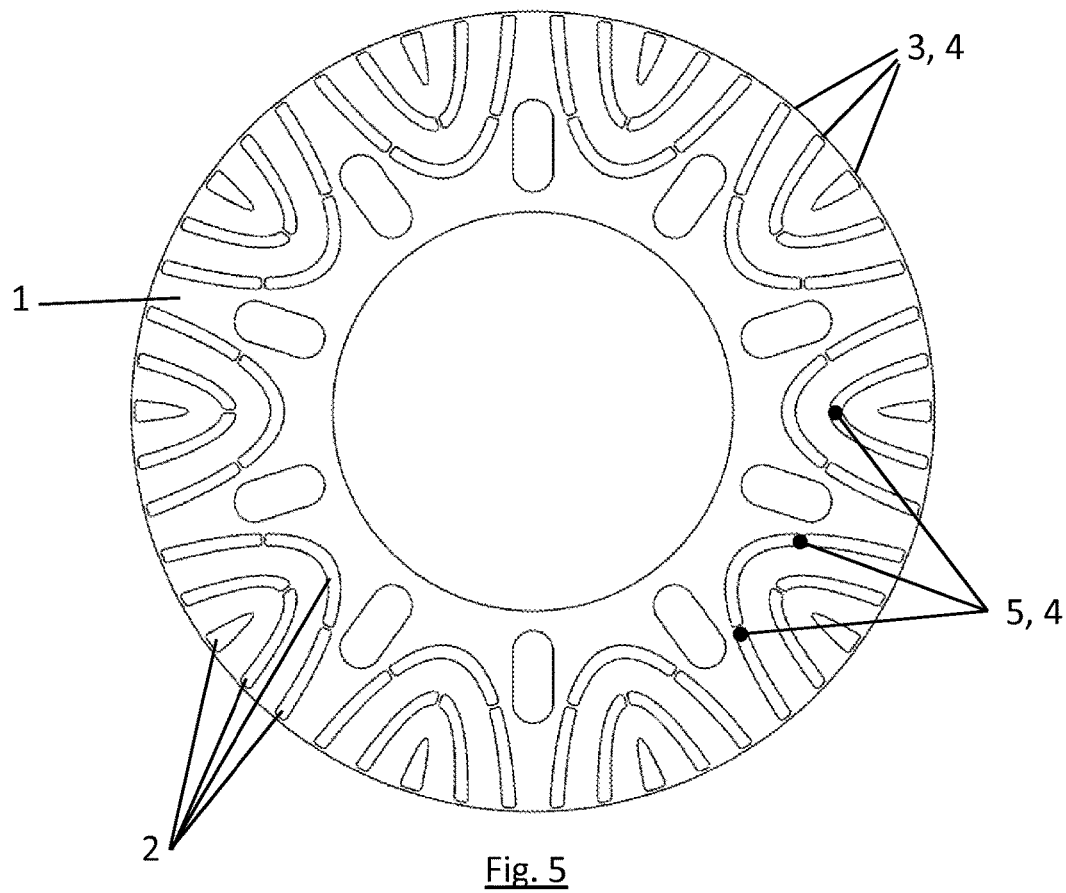
Figure 6:
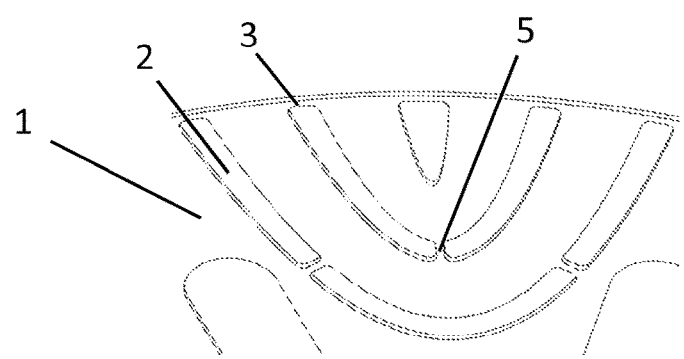

The invention will be described hereinbelow, by way of example, with reference to the drawings, in which:

FIG. 1 shows a sectional view of an electrical sheet of a rotor of a permanently excited synchronous machine, FIG. 1A shows a view of the detail "A" from FIG. 1, FIG. 2 shows a three-dimensional view of the electrical sheet according to FIG. 1, FIG. 2B shows a view of the detail "B" from FIG. 2, FIG. 2C shows a view of the detail "C" from FIG. 2, FIG. 3 shows a sectional view of an electrical sheet of a rotor with bent crosspieces, FIG. 3A shows a view of the detail "A" from FIG. 3, FIG. 4 shows a three-dimensional view of the electrical sheet according to FIG. 3, FIG. 4B shows a view of the detail "B" from FIG. 4, FIG. 4C shows a view of the detail "C" from FIG. 4, FIG. 5 shows a sectional view of an electrical sheet of a rotor of a reluctance machine, and FIG. 6 shows a view of a detail from FIG. 5.

DESCRIPTION

FIGS. 1, 1A, 2, 2B and 2C illustrate a round electrical sheet 1 which belongs to a rotor of a permanently excited synchronous machine and has pockets 2, in particular magnet pockets, oriented in a V-shaped manner and further clearances or bores. The pockets 2 are arranged in the vicinity of the outer circumference such that there is a narrow crosspiece 3 present in each case between a pocket 2 and the outer circumference. Between two pockets 2 in each case, there is likewise a narrow crosspiece 5 located at the opposite, second end of the pockets 2. The crosspieces 3, 5, as known from the prior art, are located in a plane with the rest of the electrical sheet 1.

As illustrated in FIGS. 3, 3A, 4, 4B and 4C, the invention provides the crosspieces 3 and 5, at least during production of the electrical sheet 1, with deformations 4 in a direction normal to the plane of the electrical sheet 1, preferably with bends which are in a direction normal to the electrical sheet 1. Both the process of cold forming the crosspieces 3, 5 and the design of the crosspieces 3, 5 reduce the magnetic flux density within the crosspieces, and therefore the magnetic flux density which can be used for the rotor is increased, and, at the same time, the mechanical strength of the crosspieces 3, 5 is increased. A design with deformations 4, corresponding to FIGS. 3, 3A, 4, 4B and 4C, can therefore constitute the end product according to the invention, or else an interim product during the production of an electrical sheet 1. It is therefore also possible, as illustrated in FIGS. 1, 1A, 2, 2B and 2C, for the end product of a production process according to the invention not to have any deformations 4.

FIG. 5 illustrates an electrical sheet 1 according to the invention belonging to a rotor of a reluctance machine, in particular of a synchronous reluctance machine (SRM). The electrical sheet 1 has thin crosspieces 3 between pockets 2 and the outer circumference of the electrical sheet 1 and, in addition, thin crosspieces 5 between various pockets 2. In order to improve the magnetic flux in a specific manner, it is possible for all, or some, of the thin crosspieces 3 and 5 to have a deformation 4 and in particular to be bent, in a direction normal to the plane of the electrical sheet 1. The detail view of FIG. 6 illustrates the thin crosspieces 3 and 5 of the electrical sheet 1 of the reluctance machine according to FIG. 5 without any deformations in a direction normal to the plane of the electrical sheet 1.

The invention thus makes it possible to improve an electrical machine with a rotor which has at least one electrical sheet and to improve, in particular, the magnetic flux which generates the torque of the electrical machine.

LIST OF DESIGNATIONS

1 Electrical sheet
2 Pocket
3 Crosspiece
4 Deformation
5 Crosspiece

The invention claimed is:

1. An electrical machine with a rotor which has at least one electrical sheet having an outer circumference and extending along a plane, the electrical sheet having a plurality of crosspieces, wherein each of the plurality of crosspieces has a deformation bent in a direction normal to the plane of the electrical sheet, wherein a plurality of pockets are formed in the electrical sheet, the pockets being independent of deformations, wherein the deformation of at least one of the crosspieces extends across substantially the entire distance between at least two of the plurality of pockets, and wherein the deformation of at least one of the crosspieces extends across substantially the entire distance between the outer circumference of the electrical sheet and one of the pockets.

2. The electrical machine as claimed in claim 1, wherein the electrical sheet has a planar top surface and a planar bottom surface extending along and parallel to the planar top surface and the crosspieces extend outwardly from and beyond the planar top surface and back to the planar top surface of the electrical sheet.

3. The electrical machine as claimed in claim 1, wherein the pockets are oriented in the electrical sheet in a V-shaped manner diverging radially outwardly toward the outer circumference of the electrical sheet.

4. The electrical machine as claimed in claim 3, wherein the pockets are magnet pockets and permanent magnets are arranged in the magnet pockets.

5. The electrical machine as claimed in claim 1, wherein the electrical machine is a permanently excited synchronous machine, an externally excited machine, a reluctance machine or a hybrid machine.

6. A method of producing an electrical sheet for a rotor of an electrical machine, the electrical sheet being planar and disc shaped and having an outer circumference, the method comprising:

punching a plurality of pockets into the electrical sheet, the pockets for receiving magnets and the pockets arranged such that at least one first crosspiece is defined between one of the pockets and the outer circumference of the electrical sheet, and at least one second crosspiece is defined between two of the pockets;

bending the first crosspiece in a direction normal to the plane to form a first deformation extending across substantially the entire distance between the outer circumference of the electrical sheet and one of the pockets, the first deformation being independent of the pockets, and bending the second crosspiece in a direction normal to the plane to form a second deformation extending across substantially the entire distance between the two of the pockets, the second deformation being independent of the pockets.

7. The method of producing an electrical sheet as claimed in claim 6, wherein bending the first crosspiece in a direction normal to the plane to form the first deformation includes bending the first crosspiece a plurality of times, and wherein bending the second crosspiece in a direction normal to the plane to form a second deformation includes bending the second crosspiece a plurality of times.

8. The method of producing an electrical sheet as claimed in claim 6, wherein the crosspieces, following the punching and deforming operations, are formed back again, and therefore the crosspieces, ultimately, are planar again.

9. The method of producing an electrical sheet as claimed in claim 6, wherein the pockets are magnet pockets, and therefore permanent magnets may be arranged in the magnet pockets.

10. The method of producing an electrical sheet as claimed in claim 6, wherein the pockets are oriented in the electrical sheet in a V-shaped manner diverging radially outwardly toward the outer circumference of the electrical sheet.

11. The method of producing an electrical sheet as claimed in claim 6 wherein the electrical sheet has a planar top surface and a planar bottom surface extending along and parallel to the planar top surface and the crosspieces extend outwardly from and beyond the planar top surface and back to the planar top surface of the electrical sheet.

12. An electrical machine comprising:

at least one electrical sheet having a disc shape and an outer circumference and extending along a plane, a plurality of pockets defined by the electrical sheet for receiving permanent magnets;

the electrical sheet defining a plurality of crosspieces with at least one of the plurality of crosspieces being a first crosspiece positioned between one of the pockets and the outer circumference of the electrical sheet;

the first crosspiece defining a first deformation being independent from the pockets and extending across substantially the entire radial distance between at least one of the pockets and the outer circumference of the electrical sheet, wherein the first deformation extends normal to the plane of the electrical sheet.

13. The electrical machine of claim 12 wherein the first deformation generally has an arc shape and extends to a first peak portion that is spaced from the plane of the electrical sheet, and wherein the first peak portion spans substantially the entire radial distance between at least one of the pockets and the outer circumference of the electrical sheet.

14. The electrical machine of claim 12 wherein at least one of the plurality of crosspieces is a second crosspiece being independent of the pockets and positioned between a pair of the pockets, and wherein the second crosspiece defines a second deformation extending across substantially the entire distance between the pair of pockets.

15. The electrical machine of claim 14 wherein the second deformation generally has an arc shape and has a second peak portion that is spaced from the plane of the electrical sheet, and wherein the second peak portion spans substantially the entire radial distance between the pair pockets.

* * * * *